United States Patent [19]

Brown et al.

[11] 4,196,676
[45] Apr. 8, 1980

[54] FLUID BED COMBUSTION METHOD AND APPARATUS

[75] Inventors: William R. Brown, Dublin; Gary O. Goldbach, San Jose; Dale R. Moody, Half Moon Bay; Michael A. O'Hagan, Cupertino; Fernando M. Placer, Palo Alto, all of Calif.

[73] Assignee: Combustion Power Company, Inc., Menlo Park, Calif.

[21] Appl. No.: 926,914

[22] Filed: Jul. 21, 1978

[51] Int. Cl.² .................................... F23D 19/00
[52] U.S. Cl. ............................ 110/245; 122/4 D; 431/170
[58] Field of Search ............... 110/245, 204; 431/7, 431/170; 122/4 D; 34/57 A; 432/215, 27; 209/474

[56] References Cited

U.S. PATENT DOCUMENTS

| 2,743,817 | 5/1956 | Musgrave et al. ............... 209/474 |
| 3,366,080 | 1/1968 | Albertson ....................... 110/245 X |
| 3,769,922 | 11/1973 | Furlong et al. ................ 110/245 X |
| 3,815,523 | 6/1974 | Gibeault ........................ 110/204 |
| 3,841,240 | 10/1974 | Wentworth et al. ........... 110/245 X |
| 4,130,071 | 12/1978 | Porter ............................ 110/245 |

FOREIGN PATENT DOCUMENTS 809948  4/1969  Canada .................................. 110/245

Primary Examiner—Edward G. Favors
Attorney, Agent, or Firm—Limbach, Limbach & Sutton

[57] ABSTRACT

A fluid bed combustion method and apparatus are disclosed utilizing an induced draft fan downstream of the exhaust port of the combustion chamber. Fluidizing air is given a velocity vector toward one side of the chamber for moving foreign objects to that side where the objects are removed and separated by air classification from bed particles which are returned to the fluid bed. Air classification is accomplished using a blower which is valved off during preheat operation to draw hot air from above the fluid bed down through the particle bed.

14 Claims, 6 Drawing Figures

FLUID BED COMBUSTION METHOD AND APPARATUS

The present invention relates in general to fluid bed combustion systems and, more particularly, to systems for burning low quality fuel in a fluid bed reactor.

DESCRIPTION OF THE PRIOR ART AND THE INVENTION

Fluid bed reactor systems have been proposed in the past for combustion of various different types of materials. One such fluid bed reactor system is described in U.S. Pat. No. 3,589,313 to Smith et al for combustion of solid waste and use of the energy produced in the combustion phase for other aspects of the system. For example, the exhaust gases from combustion chamber are expanded through the expansion and drive portion of a compressor-turbine which drives both a compressor for fluidizing the particles in the fluid bed reactor and an electric generator for delivering electric power. A low pollution incineration system for solid waste, such as fragments of wood, is described in U.S. Pat. No. 4,060,041 to Norman K. Sowards wherein a vortex is established above the fluid bed to improve complete combustion.

These systems suffer from a number of disadvantages, including, by way of example, drawbacks in isolation of the combustion chamber by reason of pressurization of the combustion chamber. Pressurization of the combustion chamber presents difficulties in directing the fuel to be consumed into the combustion chamber and removing the products of combustion such as hot exhaust gases in exhaust conduit systems and foreign objects or inerts which are introduced into the system through the material to be combusted and which collect in the fluid bed. For example, the Smith et al patent discloses rotary feeders for introducing the solid waste into the combustion chamber and a rotary air lock valve in the very bottom of the bed for removal of inerts which accumulate in the bottom of the bed. In one embodiment in the Soward patent a vortex generator is used to introduce air under pressure into the combustion chamber. In another embodiment this air is also used to "suck" the combustible material into the chamber, and both granular bed material and tramp material are extracted at the bottom of a cone, screened for separation and separated bed material returned to the fluid bed.

In U.S. Pat. No. 3,982,884 to Godel tramp material is conveyed with bed material via a conveyor from the bottom of a main chamber into an auxiliary chamber where the conveyor rises above the top of the bed to discharge the tramp material.

Since the fluid bed reactors operate with the bed of inert particles at high temperature for combustion of the material therein, each time a fluid bed reactor is placed into operation after a period of idle time, the fluid bed particles must be preheated in order to begin combustion of the combustible materials. One way in which fluid bed particles have been preheated in the past has been the use of a hot flame directed onto the top surface of the particles or into the bed or articles as shown in British Pat. No. 890,986. The exhaust gases from this hot jet are exhausted out of a conventional exhaust near the top of the combustion chamber that is normally used to exhaust gases resulting from combustion of the combustible material. The high temperature resulting from the application of a direct flame onto or into the fluid bed within the combustion chamber requires that precautions be taken not to injure the particles of the apparatus.

Another technique for preheating the fluidized bed particles is to heat the fluidizing air stream that is directed into the chamber at its bottom and up through the bed particles. This technique suffers from the disadvantage that the air blower power consumption is high, the amount of fuel required to heat the air sufficiently is high, and the ducting for the introduction of the air and porous grate that supports the fluidized bed particles are subjected to very high temperatures. Still another method of preheating the fluidized bed particles is to introduce simultaneously into the combustion chamber the fluidized bed particles and fuel for simultaneous bed filling and heating. This technique suffers from the disadvantage of requiring high blower power and fuel consumption. Additionally, the particles must be moved into and out of the chamber during each operating cycle. An unscheduled shutdown of the reactor and a resulting cooling of the bed particles requires a special start-up sequence which is undesirable.

Another apparatus for preheating a fluid bed is described in U.S. Pat. No. 3,769,922 to Furlong et al. and assigned to assignee of the present application and wherein is disclosed method and apparatus for back flowing a low velocity stream of hot air through the particle bed from top to bottom by taking a stream of air from a blower into a preheat combustor from which the products of combustion plus excess air are mixed to the desired preheat gas temperature and passed into and down through the fluid bed. This system requires, not only valving off the blower designed for fluidizing the bed of particles, but also valving off the inlet for introducing the combustible material into the combustion chamber and the exhaust stack through which combustion products exit from the combustion chamber.

For movement of different sized particles in a fluidized bed it is known to provide a laterally directed stream of air to move heavier particles in one direction. For example, U.S. Pat. No. 2,743,817 to Musgrave discloses a system for segregating whole nuts, such as filberts, from broken bits of shells and similar foreign matter by positioning these materials on a porous bed through which is directed a fluidizing stream with components in a lateral direction. The heavier particles which settle to the bottom of the bed are thereby shifted laterally and then separated by sucking the upper lighter particles off the top of the laterally moving mass. There is an obvious difficulty in applying a lateral separation to heavier inert particles or foreign matter in a fluid bed reactor because of the depth of the fluid bed and the difficulty in extracting the segregated larger particles from the inert granular material, such as sand, which makes up the bulk of the fluid bed.

The present invention is directed to a unique fluid bed combustion system which avoids the difficulties presented with prior art systems and produces a system that is efficient by reason of the interrelated actions of the various different features of the invention.

In accordance with one aspect of the present invention a fluid bed combustion method and apparatus is provided in which foreign objects, such as large inert members, are removed from the system by fluidizing the particle bed with an air stream having a lateral direction toward an exit opening from the particle bed removing the foreign objects and inerts from the bed at the one side of the chamber and separating the foreign objects from the quantity of particles making up the fluidized bed with an air classifying stream which returns the fluidized particles to the particle bed, but allows the foreign material and heavier inerts to drop down an exit passageway. In accordance with another aspect of the invention the combustible materials being introduced into the combustion chamber are introduced at the side of the combustion chamber at which the foreign materials are removed.

A feature and advantage of the present invention is the continual lateral shifting of the heavier and inert foreign objects in the fluidized bed that prevents a general accumulation at the center of the bed to establish a more uniform environment for combustion throughout the bed and the combustion chamber.

In addition, introduction of the combustible materials into the side of the combustion chamber at which the foreign material is removed results in a circulation of the combustible materials throughout the bed for a better more complete combustion of the combustible materials.

In accordance with another aspect of the present invention, the lower end of the passageway through which foreign material is removed from the combustion chamber is closed off to prevent exhaust gases from flowing out of the passageway. In accordance with this invention the lower end of this passageway can be closed off either by a quantity of the foreign objects filling the lower end of this passageway or by projection of the lower end of the passageway into a collection tank that has a quantity of fluid, such as water, above the outlet of the passageway. With this construction a conveyor is provided in the bottom of the collection tank for removal of the foreign objects as they are removed from the fluid bed in the combustion chamber.

A feature and advantage of the construction set forth in the previous paragraph is the sealing off of the passageway permitting the air classifier stream to redirect inert particles from the particle bed back into the combustion chamber without losing pressure in the air classifying stream by leakage out of the system with the foreign particles being withdrawn.

In accordance with another aspect of the present invention, the inert particles from the particle bed separated from the foreign material are reintroduced at the surface of the particle bed or above the surface of the particle bed with a substantially horizontal direction of flow to maintain the desired circulation of combustible materials in the fluid bed.

In accordance with another aspect of the present invention, a fluid bed combustion method and apparatus are provided in which the burner is operated at a negative draft condition through the use of an induced draft fan downstream of the exhaust port of the combustion chamber.

A feature in advantage of this aspect of the invention is the ability to introduce fuel directly into openings in the combustion chamber without requiring valvings, such as rotary air locks or chambers. This method and apparatus also enables the introduction of recirculating air into the combustion chamber to control the temperature of the combustion chamber again through the drawing action of the draft fan downstream of the gas exit in the combustion chamber.

In accordance with still another aspect of the present invention, a fluid bed combustion method and apparatus is provided wherein preheating of the fluid bed is accomplished by introducing and igniting a fuel into the combustion chamber well above the bed of inert particles, closing off the flow of air up through the quantity of particles in the fluid bed and drawing heated air from the combustion above the quantity of particles down through the quantity of particles to heat the particles. A feature in advantage of this aspect of the present invention is that the highest temperature established for heating the bed is well above the bed in the region of high temperature operation of the combustion chamber. By reason of drawing the heated air down through the bed of inert particles, air for combustion with the fuel above the fluid bed can be drawn in through the combustible material inlet, the normal gas outlet, and the recirculating air inlet, thereby avoiding the necessity for valves to close off each of these openings during preheating of the system.

Still another feature in advantage of this aspect of the invention is the dual use of a single blower for operation during the preheating stage to draw hot gases down through the bed of inert particles and then during normal operation of the combustion system to serve as the air source for the stream of air to separate the foreign objects and heavy inert particles from the quantity of inert particles of the fluid bed by air classification. These features and advantages of the present invention will become more apparent on perusal of the following specification taken in conjunction with the accompanying drawings wherein similar characters of reference referred to similar elements in each of the several views.

DESCRIPTION OF THE PREFERRED EMBODIMENT

While it will be appreciated from the following detailed description that the present invention has a number of different aspects which are applicable to combustion of different types of materials in fluid bed reactors, the invention is ideally suited to the combustion of low quality fuels which have a large proportion of foreign material or inert objects. Typical characteristics of such low quality fuels are high moisture levels such as up to 65% on an as-received basis, high inert levels such as up to 50% on a dry basis, and sizes from fines up to articles 18" in diameter and 6' long.

Figure 1:
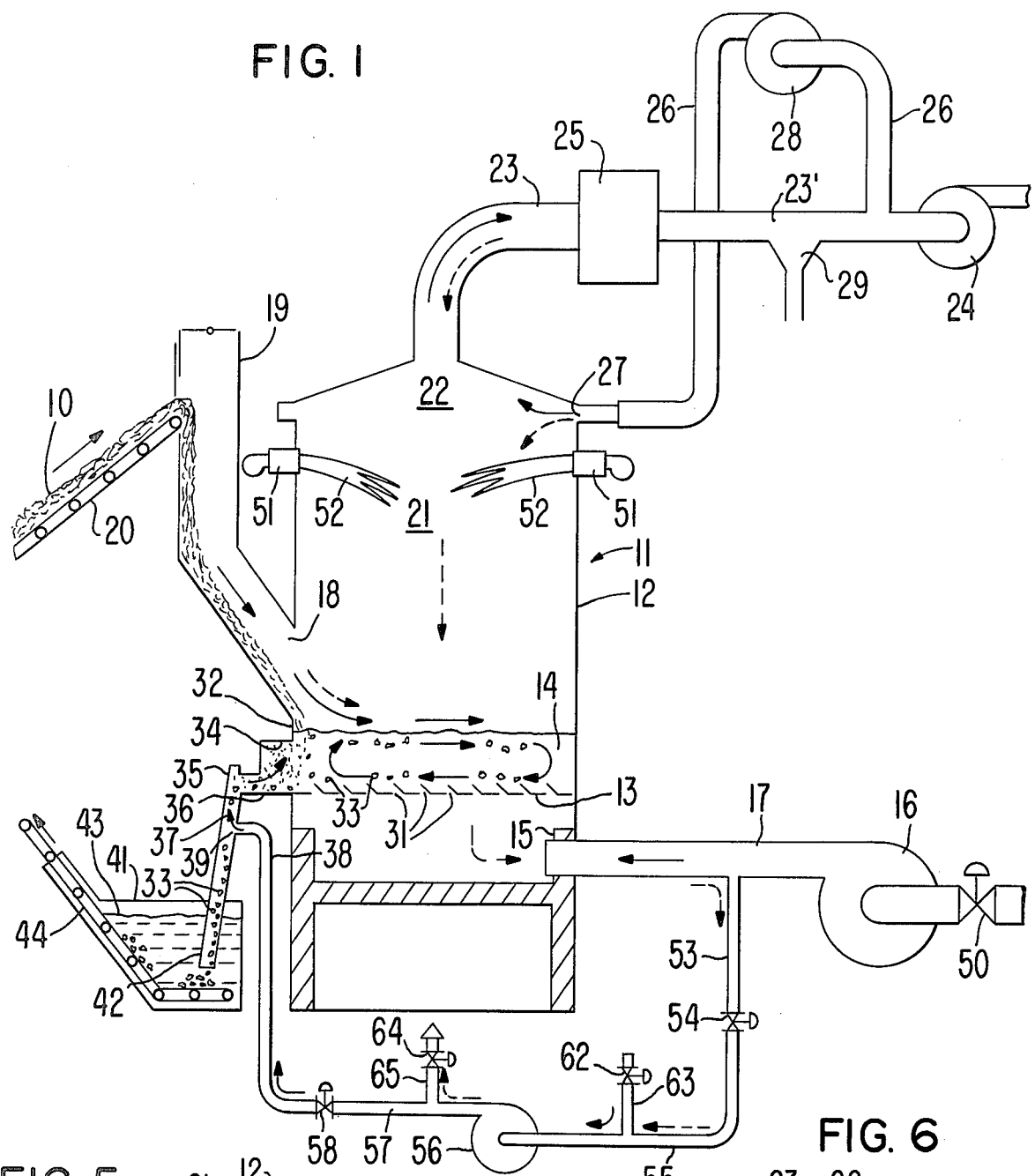
FIG. 1 is a schematic elevational view, partially in section illustrating the fluid bed combustion method and apparatus in accordance with the present invention.

A system for burning such material is illustrated in FIG. 1 which shows a fluid bed reactor or combustion assembly 11 having an upstanding combustion chamber 12 typically cylindrical which is provided in the lower interior portion thereof with a porous particle support structure 13 such as a distribution plate for supporting a bed of granular inert particles 14. A particle bed material for consuming combustible material such as lumber log yard debre, clarifier sludge, fly ash and char is crystalline beach sand. For cleaner combustible materials such as hog fuel and some coals, a krolinite grog can be used. For higher sulfur fuels such as coal and shale, a limestone or dolomite material can be used to react with the sulfur and thereby eliminate emissions of sulfur dioxide. The height of the fluid bed can be varied to match combustion requirements of different fuels.

A first opening or fluidizing air inlet 15 is provided in the combustion chamber 12 below the porous support structure 13 for delivering a stream of air under pressure from the outlet of a fluidizing fan 16 via a conveying conduit or pipe 17. A second opening or fuel inlet 18 to the chamber 12 is provided for introducing combustible material into the combustion chamber 12 via an elevated feed chute or stack 19 into which the combustible material 10 is introduced via a conveyor 20. As will be appreciated from the further description below it is not necessary in the system in accordance with the present application to provide valving such as rotary air locks or chambers to prevent escape of gaseous exhaust products through the fuel inlet 18 and the stack 19.

Gaseous exhaust products from the combustion which takes place within the bed of particles 14 or the region 21 in the combustion chamber above the bed of particles 14 are drawn out of the chamber 12 through a third opening 22 in the top thereof via a pipe or conduit 23 by an induced draft fan 24. The fan 24 draws the exhaust gases through a dryer 25 wherein heat is removed by heat exchange with materials such as materials to be combusted in the system. Cooled recycle air such as from the pipe 23' between the dryer 25 and the fan 24 is conveyed via the conduit or pipe 26 and a blower 28 through an opening 27 to the upper portion of region 21 in the combustion chamber for the purpose of blending with and thereby cooling the products from the combustion process. A cyclone separator 29 is provided in pipe 23' to remove any material picked up by the exhaust air stream in the dryer 25.

The normal flow of air streams and materials in the combustion method and apparatus is illustrated in FIG. 1 using solid lines for the tails of directional arrows.

The porous support structure 13 for supporting and fluidizing the bed of particles 14 is provided with openings 31 which direct the air stream into the quantity of particles with a velocity vector directed toward one side 32 of the combustion chamber 12 for aiding in the removal of foreign objects 33 such as rocks, oversize inert members, tramp metal, etc. from the combustion chamber. An exit opening 34 is provided at the bottom of the bed of particles 14 at the one side 32 of the combustion chamber for removing these foreign objects 33 through a pipe or passageway 35.

A rock discharge plate 36 is provided either horizontally or downwardly inclined into the pipe 35 at the bottom of the quantity of particles 14 whereby the removed foreign objects 33 and a small portion of the inert particles of the quantity of particles 14 descend in the passageway 35. A stream of air 37 is introduced from a pipe 38 through an opening 39 into the passageway 35 for separating the foreign objects 33 from the inert particles 14. The air stream 37 moves upward in passageway 35 carrying particles 14 back to near the top of the bed of particles 14 and with a direction toward the opposite side of the chamber 12 from the one side 32. The heavier foreign objects 33 fall downwardly through the upwardly moving stream of air 37 into a tank 41. The lower end 42 of pipe 35 projects into a fluid material 43 such as water in the tank 41 for sealing off air communication out through the lower end of passageway 35. A conveyor 43 is provided with its initial pickup portion beneath the lower end 42 of pipe 35 for removal of the foreign objects 33 from the tank 41.

In the operation of the present invention when the bed of inert particles 14 has previously been heated, the combustible material 10 moves into the bed of particles 14 fluidized by the air stream from the fan 16 whereby the combustible material is heated to ignition temperature and combustion takes place. The foreign objects 33 sink to the bottom of the fluid bed and are conveyed to one side of the combustion chamber 12 and are removed there. With the lateral movement of the foreign objects to the one side of the combustion chamber and the introduction of the combustible material at that side of the combustion chamber, circulation of the combustible material takes place in the fluid bed in the manner illustrated. The exhaust gases are drawn off from the top of the combustion chamber by the induced draft fan 24.

Preheating of the quantity of particles 14 is accomplished in accordance with the present invention utilizing the unique cooperation of the induced draft operation of the combustion chamber and the source for the classifying stream of air 37 which separates the foreign objects from particles of the fluid bed.

In preheating the quantity of particles the induced draft fan 24 and the fluidizing fan 16 are not operated and a valve 50 in the air inlet line to the fluidizing fan 16 to closed off thereby closing off the flow of air from the fan 16 to the region beneath the bed of particles 14.

A source of preheating fuel such as oil burners 51 is provided in the upper region 21 of the combustion chamber 12. Upon ignition, the oil burners 51 provide flames 52 and heat the air in the region 21 of combustion chamber 12.

Communication is provided to the region below the support structure 13 such as through the opening 15 for withdrawing air through a pipe 53, a valve 54 and a pipe 55 connected to the inlet side of a blower 56. The outlet side of blower 56 is connected via a pipe 57 and a valve 58 to the pipe 38 through which the air stream 37 is introduced into passageway 35. A valve 62 is provided in an intake air stack 63 which is connected to pipe 55, and a valve 64 is provided in an exhaust air stack 65 connected to pipe 57.

For the preheating operation of the combustion method and apparatus, valve 54 is open; valve 62 is closed; valve 64 is open; and valve 58 is closed. Air flow follows the direction shown by the arrows having the dashed tails in FIG. 1. Air for combustion of the oil burner fuel is taken into the chamber through opening 22 from the nonoperating fan 24, through opening 27 from pipe 26 and through opening 18 from the chute 19. By action of the blower 56 hot gases are drawn down through the quantity of particles 14 and the porous support structure 13 and through opening 15, pipe 53, conduit 54 and pipe 55 to the blower 56 and thence to pipe 57, exhaust stack 65 and valve 64 to atmosphere.

When the bed of particles has reached the temperature for desired operation, the flow pattern is switched to that shown by the arrows with the solid tails. Thus, valve 54 is closed; valve 62 is opened; valve 64 is closed;

valve 58 is opened; and the oil burners 51 are turned off. Valve 50 is opened; the fluidizing fan 16 and induced draft fan 24 are turned on; and the conveyor 20 is operated introducing combustible material into the combustion chamber. Fluidizing air from the fan 16 will fluidize the bed of particles and the gaseous combustion products will be withdrawn from the combustion chamber 12 via the induced draft fan 24. Air is drawn in through valve 62, pipe 63 and pipe 55 to the blower 56 and directed through pipe 57, valve 58 and pipe 38 into the passageway 35 for separating the foreign objects from the particles of the particle bed. It will be appreciated that the blower 56 serves to withdraw air downwardly through the bed of particles 14 during the preheat operation and introduce the air stream 37 into passageway 35 during normal operation thereby serving a dual function.

Figure 2:
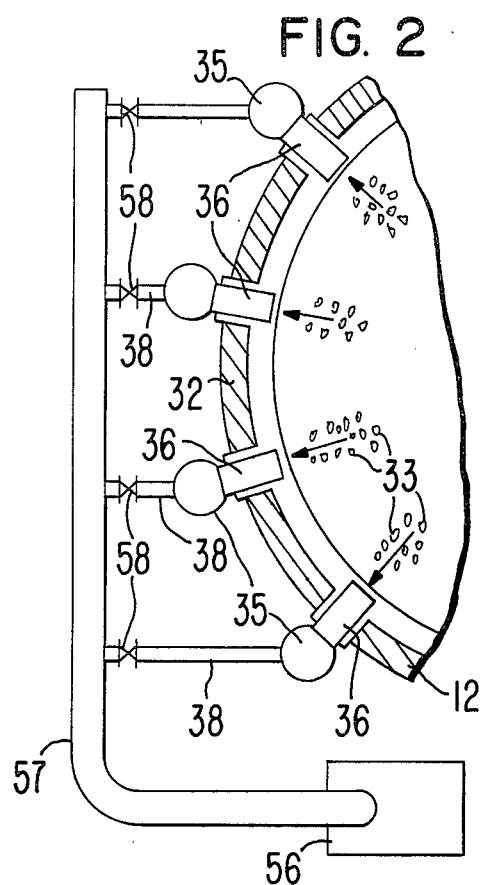
FIG. 2 is a sectional view of a portion of the structure shown in FIG. 1 taken along line 2—2 in the direction of the arrows.

It will be appreciated that as shown in FIG. 2 a plurality of foreign object separating passageways 35 can be provided along the one side 32 of the chamber 12. These can be individually valved off with valves 58 whereby one or more of the passageways can be shut down from operation.

Figure 3:
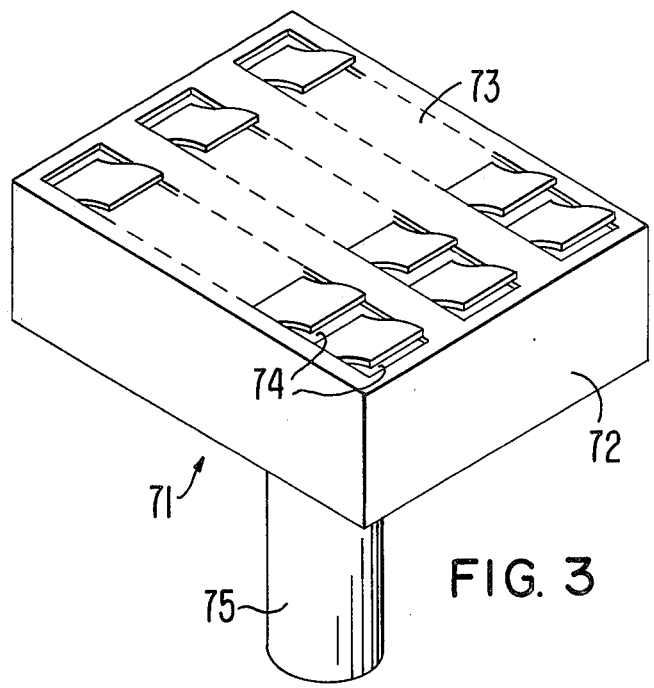
FIG. 3 is an enlarged elevational view showing a portion of the structure illustrated in FIG. 1.

It will be appreciated that the porous support structure can take one of a number of different forms. The structure may be a perforated distribution plate with angle openings or louvers to provide the desired sideways velocity vector or can consist of a plurality of tuyeres provided with top perforated members connected either to a duct or a main plenum. A tuyere or bed nozzle 71 is shown by way of example in FIG. 3 with a box-like chamber 72 provided with a louvered top surface 73 to provide the desired directional openings 74, and air is fed into the chamber 72 for passage out of the opening 74 from a feed pipe 75 which is connected through a distribution plate which subdivides the combustion chamber 12.

Figure 3A:
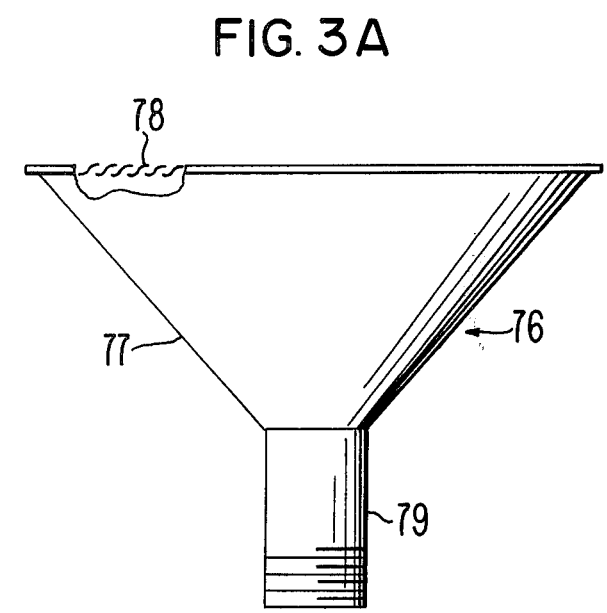
FIG. 3a is a view similar to FIG. 3 showing an alternative embodiment of the present invention.

An alternative tuyere construction 76 is shown in FIG. 3a wherein the tuyere includes a conical side wall 77 covered by a louvered top surface 78 and to which air is fed from a feed pipe 79. With rows of tuyeres 76 connected to a series of air ducts in a wall which subdivides the combustion chamber 12, selective reduction or shut down of the air flow to the bed of particles can be accomplished in different portions of the fluid bed as described with FIG. 6.

Figure 4:
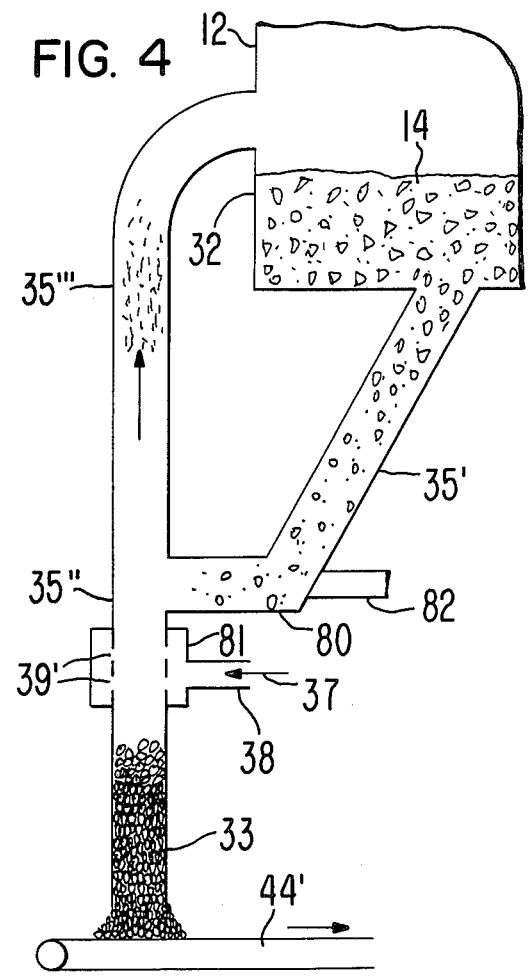
FIG. 4 is an elevational sectional view showing an alternative embodiment to portions of the structure shown in FIG. 1.

It will be appreciated that the structural details of removing the foreign objects can take various different configurations. One such alternative configuration is shown in FIG. 4 wherein the passageway 35' is directed downwardly at an angle from adjacent the one side 32 of the chamber and connected to a vertical extension 35" via a substantially horizontal connection pipe 80. The classifying stream of air 37 from pipe 38 enters an annular chamber 81 surrounding the passageway 35" and enters the passageway 35" through openings 39' in the wall of the passageway 35" within the annular chamber 81. The foreign objects drop down in the passageway 35" and build up on the conveyor 44". A quantity of the foreign objects 33 are allowed to build up in passageway 35" to serve to seal off the lower end of the passageway to prevent escape of air thereto. An upper extension 35"' is provided to the passageway 35" through which the removed and separated particles are returned to the combustion chamber near the level of the top of the bed of particles 14. The horizontal pipe 80 prevents an uncontrolled drop of the foreign objects 33 and bed particles being removed. An air stream can be injected from a pipe 82 at the elbow connection between passageway 35' and the connection pipe 80 to clean out or keep a controlled flow of material through pipe 80.

Figure 5:
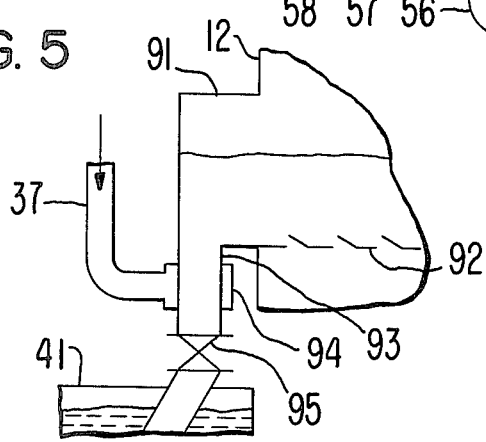
FIG. 5 is a schematic elevational sectional view showing an alternative construction to a portion of the structure shown in FIG. 1.

FIG. 5 shows another alternative construction for the combustion apparatus wherein the wall of the combustion chamber 12 is extended outwardly by a wall 91 a distance above the bed with the porous support structure 92 also extending outwardly at that position to establish the downwardly extending passageway 93 at the outer portion of these structures. Foreign objects and inert particles are removed from the bed at this portion and the foreign objects drop down passageway 93 and separated from the inert particles which are carried back into the bed by the classifying stream of air 37 which enters an annular chamber 94 surrounding the passageway 93. A valve 95 is provided near the lower end of the passageway 93 and can be used to drop the foreign objects down into a tank 41 containing water.

Figure 6:
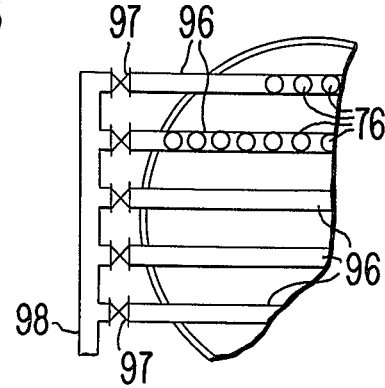
FIG. 6 is a horizontal sectional view of a portion of the combustion chamber illustrating another alternative construction shown in FIG. 1.

FIG. 6 illustrates how the tuyeres 76 can be connected to air ducts 96 which are each connected via a valve 97 to a common plenum or fluidizing air inlet pipe 98. With these valves selective reduction or shut down of air flow to the particle bed can be accomplished in different portions of the particle bed.

What is claimed:

1. In a fluid bed combustion apparatus having,
an upstanding combustion chamber,
a porous support structure within the combustion chamber supporting a quantity of finely divided inert particles,
a first opening into the combustion chamber below the porous structure for introducing a stream of air for passage up through the porous support structure for fluidizing the quantity of particles,
a second opening into said combustion chamber for introducing combustible material which contains foreign objects,
a third opening at the top of the combustion chamber above the particles for passing products of combustion out of the combustion chamber,
the improvement for removing foreign objects from the quantity of inert particles comprising:
a foreign object removal opening for removal of foreign objects from the quantity of particles,
at least one downwardly directed passageway communicating with said foreign object removal opening,
means at a plurality of locations beneath the quantity of particles for introducing fluidizing air into the quantity of particles in a lateral direction toward said foreign object removal opening,
means for introducing an upwardly directed stream of air in said downwardly directed passageway for separating the light inert particles from heavy foreign objects,
said foreign object removal opening being located at only one side of said combustion chamber, and
means for introducing combustible materials into said combustion chamber at said one side thereof whereby the combustible material circulates through said quantity of particles.

2. The fluid bed combustion apparatus of claim 1 wherein said removal means includes means closing off air flow from the bottom of said passageway.

3. The fluid bed combustion apparatus in accordance with claim 2 wherein said means closing off the bottom of said passageway includes a quantity of foreign objects removed from the quantity of particles.

4. The fluid bed combustion apparatus in accordance with claim 2 wherein said means closing off the bottom of said passageway includes a foreign object collection tank into which said passageway projects and a quantity of fluid having a level above the outlet of said passageway.

5. The fluid bed combustion apparatus in accordance with claim 1 including a plurality of tuyeres spaced apart across said combustion chamber and serving as said porous support structure, each of said tuyeres having a top louvered surface for supporting a portion of said quantity of inert particles and passing an upwardly directed particle fluidizing air stream with the louvers aligned to provide a velocity vector to the air stream to said one side of said combustion chamber.

6. The fluid bed combustion apparatus in accordance with claim 5 including a plurality of ducts, each of said ducts connected to a plurality of said tuyeres for passing fluidization air streams to different portions of said quantity of inert particles.

7. The fluid bed combustion apparatus in accordance with claim 6 including means for closing off at least certain of said ducts for allowing selective reduction of shut-down of the flow of fluidizing air in different portions of said quantity of particles.

8. The fluid bed combustion apparatus in accordance with claim 1 including means for introducting and igniting a fuel within said combustion chamber above said quantity of particles,
means for closing off said stream of air for passage up through the porous support structure for fluidizing the quantity of particles, and
means communicating with said first opening for drawing air from the portion of said combustion chamber above said quantity of particles through said quantity of particles and through said porous support structure.

9. The fluid bed combustion apparatus in accordance with claim 8 including
an air blower,
means for connecting the inlet side of said blower to said first opening as part of said second means communicating with said first opening for drawing air from the portion of said combustion chamber above the quantity of particles through said quantity of particles and through said porous support structure for preheating said quantity of particles, and
means for connecting the outlet side of said air blower to said downwardly directed passageway as part of said means for introducing an upwardly stream of air in said downwardly directed passageway for separating the light inert particles from heavy foreign objects during operation of the combustion apparatus.

10. The fluid bed combustion apparatus in accordance with claim 1 including
an induced draft fan and
means for connecting the inlet to said induced draft fan in communication with said third opening for establishing a negative drift condition in the portion of said combustion chamber above said quantity of particles 11. The fluid bed combustion apparatus of claim 10 including means for removing heat from the exhaust stream of air from the portion of said combustion chamber above said quantity of particles.

12. In a fluid bed combustion apparatus having,
an upstanding combustion chamber,
a porous support structure within the combustion chamber supporting a quantity of finely divided inert particles,
a first opening into the combustion chamber below the porous structure for introducing a stream of air for passage up through the porous support structure for fluidizing the quantity of particles,
a second opening into said combustion chamber for introducing combustible material which contains foreign objects,
a third opening at the top of the combustion chamber above the particles for passing products of combustion out of the combustion chamber,
the improvement for removing foreign objects from the quantity of inert particles comprising:
a foreign object removal opening for removal of foreign objects from the quantity of particles,
at least one downwardly directed passageway communicating with said foreign object removal opening,
means at a plurality of locations beneath the quantity of particles for introducing fluidizing air into the quantity of particles in a lateral direction toward said foreign object removal opening,
means for introducing an upwardly directed stream of air in said downwardly directed passageway for separating the light inert particles from heavy foreign objects,
an induced draft fan,
means for connecting the inlet to said induced draft fan in communication with said third opening for establishing a negative draft condition in the portion of said combustion chamber above said quantity of particles,
means for removing heat from the exhaust stream of air from the portion of said combustion chamber above said quantity of particles, and
means downstream of said heat removing means for conveying cooled exhaust air from said heat removal means to the upper portion of said combustion chamber above said quantity of particles for blending with and thereby cooling the gaseous products from the combustion process.

13. The method of combusting material in a fluid bed combustion chamber utilizing a quantity of finely divided inert particles comprising the steps of:
fluidizing the bed of particles with a upwardly directed stream of air,
introducing a combustible material directly into the combustion region above said quantity of particles,
drawing exhaust products from the combustion region above the quantity of particles,
cooling gaseous exhaust products drawn from the combustion region and
recycling at least a portion of said cooled gaseous exhaust products to the combustion region above said quantity of particles.

14. The method of combusting material in a fluid bed combustion chamber utilizing a quantity of finely divided inert particles and removing foreign objects from the particles comprising the steps of:
fluidizing the bed of particles with a upwardly directed stream of air, directing the stream of air through the quantity of particles with a horizontal velocity vector directed toward an opening into a downward passageway for removing foreign objects in said quantity of particles toward said passageway, withdrawing said foreign objects and a portion of said quantity of particles through said opening into said passageway, returning said withdrawn and separated particles to said quantity of particles only at the same side of said chamber as said downward passageway, and introducing the combustible material directly into the combustion region at only the same side of the combustion chamber as said returned particles.

* * * * *